(12) United States Patent
Lee et al.

(10) Patent No.: US 7,916,411 B1
(45) Date of Patent: Mar. 29, 2011

(54) LENS MODULE WITH POLYGONAL FILTER

(75) Inventors: Chai-Wei Lee, Taipei Hsien (TW);
Hou-Yao Lin, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 0 days.

(21) Appl. No.: 12/770,683

(22) Filed: Apr. 29, 2010

(30) Foreign Application Priority Data

Dec. 2, 2009 (CN) .......................... 2009 1 0310758

(51) Int. Cl.
*G02B 7/02* (2006.01)

(52) U.S. Cl. ........................................ 359/819; 359/829

(58) Field of Classification Search .................. 359/819, 359/829, 830
See application file for complete search history.

(56) References Cited

U.S. PATENT DOCUMENTS

2008/0084619 A1\* 4/2008 Lee ............................... 359/820
\* cited by examiner

*Primary Examiner* — William C Choi
(74) *Attorney, Agent, or Firm* — Zhigang Ma

(57) ABSTRACT

A lens module includes a lens barrel, a number of lenses, a holder and a polygonal filter. The lens barrel includes an annular plate extending inwards from an inner surface thereof. The lenses are received in the lens barrel. The holder holds the barrel and the lenses. The polygonal filter is received in the lens barrel and positioned on the annular plate. The polygonal filter has six or more sides.

11 Claims, 4 Drawing Sheets

LENS MODULE WITH POLYGONAL FILTER

BACKGROUND

1. Technical Field

The present disclosure relates to lens modules and, particularly, to a lens module with a polygonal filter.

2. Description of Related Art

Filters are widely used in lens modules for passing or blocking light rays of a predetermined wavelength. To fit within a hollow cylindrical lens barrel of the lens modules, the filters often have a circular configuration. However, to obtain such circular configuration, the filter needs to be subjected to a roll grinding process, which is inefficient.

Therefore, it is desirable to provide a lens module with a polygonal filter, which can overcome the above-mentioned limitations.

DETAILED DESCRIPTION

Figure 1:
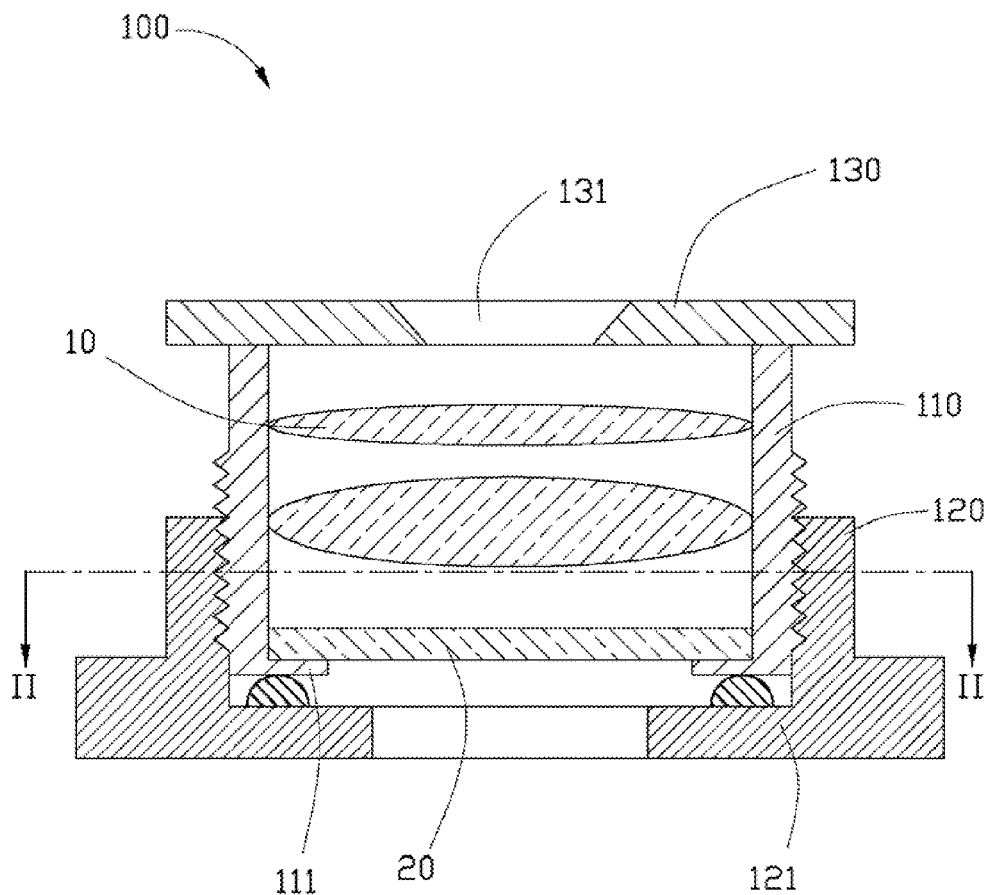
FIG. 1 is a cross-sectional view of a lens module, according to one exemplary embodiment.
Figure 2:
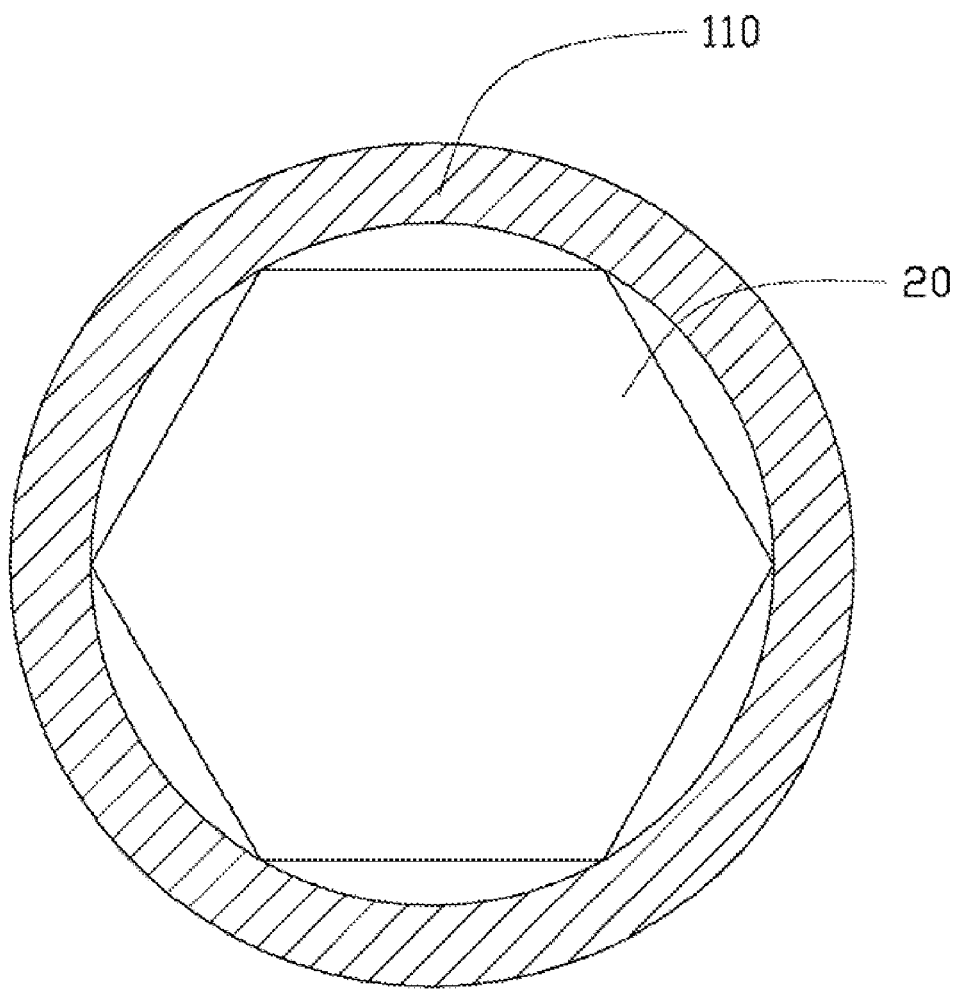
FIG. 2 is a cross-sectional view of a lens holder and a filter of the lens module of FIG. 1, taken along line II-II.

Referring to FIGS. 1-2, a lens module 100, according to a first embodiment, includes a hollow cylindrical lens barrel 110, a number of lenses 10, a polygonal filter 20, a hollow cylindrical holder 120, and an annular cover 130.

The lenses 10 are received in the lens barrel 110 and held by the inner cylindrical surface of the lens barrel 110. The number of sides of the polygonal filter 20 can be six or more than six. In this embodiment, the polygonal filter 20 is a regular hexagonal filter, and is configured so as to be fittingly received in the lens barrel 110, and held by the inner cylindrical surface of the lens barrel 110 (i.e., the diagonal of the polygonal filter 20 is substantially equal to the inner diameter of the lens barrel 110), for blocking infrared light rays entering into the lens barrel 110 and incident light thereon. An image-side end of the lens barrel 110 is threadedly received in the holder 120. The cover 130 is fixed to an object-end of the lens barrel 110.

The lens barrel 110 is not limited to this embodiment, but can be conformed to other configurations, such as a hollow polygonal barrel. Each lens 10 can remain unchanged (i.e., cylindrical) or can be reshaped into a corresponding polygonal configuration instead.

The lens module 100 includes an annular plate 111 formed at the image-side end of the lens barrel 110. In this embodiment, the annular plate 111 is integrally formed with the lens barrel 110 and perpendicularly extends inward from the inner cylindrical surface of the lens barrel 110.

The holder 120 forms a stepped portion 121 in an interior, bottom portion thereof for supporting the barrel 110 thereon. The cover 130 defines an aperture 131 generally at the center thereof, to allow light rays to pass therethrough. The inner diameter of the annular plate 111 is greatly larger than the diameter of the aperture 131 to avoid affecting the F/value of the lens module 100, which is determined by the diameter of the aperture 131.

The polygonal filter 20 is positioned on the annular plate 111. Corners of the polygonal filter 20 are adhered on the top surface of the annular plate 111 and the inner cylindrical surface of the lens barrel 110 by transparent glue. Provided that the adhesion strength is sufficient to secure the polygonal filter 20 to the annular plate 111, the glue can be only applied to only a part of the corners of the polygonal filter 20 in other alternative embodiments. In the present disclosure, the transparent glue may be ULTRA-RED (UV) glue. Instead of being fittingly held by the inner cylindrical surface of the lens barrel 110, the diagonal of the polygonal filter 20 can be slightly shorter than the inner diameter of the lens barrel 110. As such, the polygonal filter 20 can be snugly received in the lens barrel 110. Furthermore, a diameter of the inscribed circle of the polygonal filter 20 is larger than the inner diameter of the annular plate 111. As such, all light rays transmitting through the lens barrel 110 must go through the polygonal filter 20 and thus the filtering quality of the polygonal filter 20 is guaranteed.

The annular plate 111 of the lens barrel 110 can be formed on the other end away from the holder 120.

Figure 3:
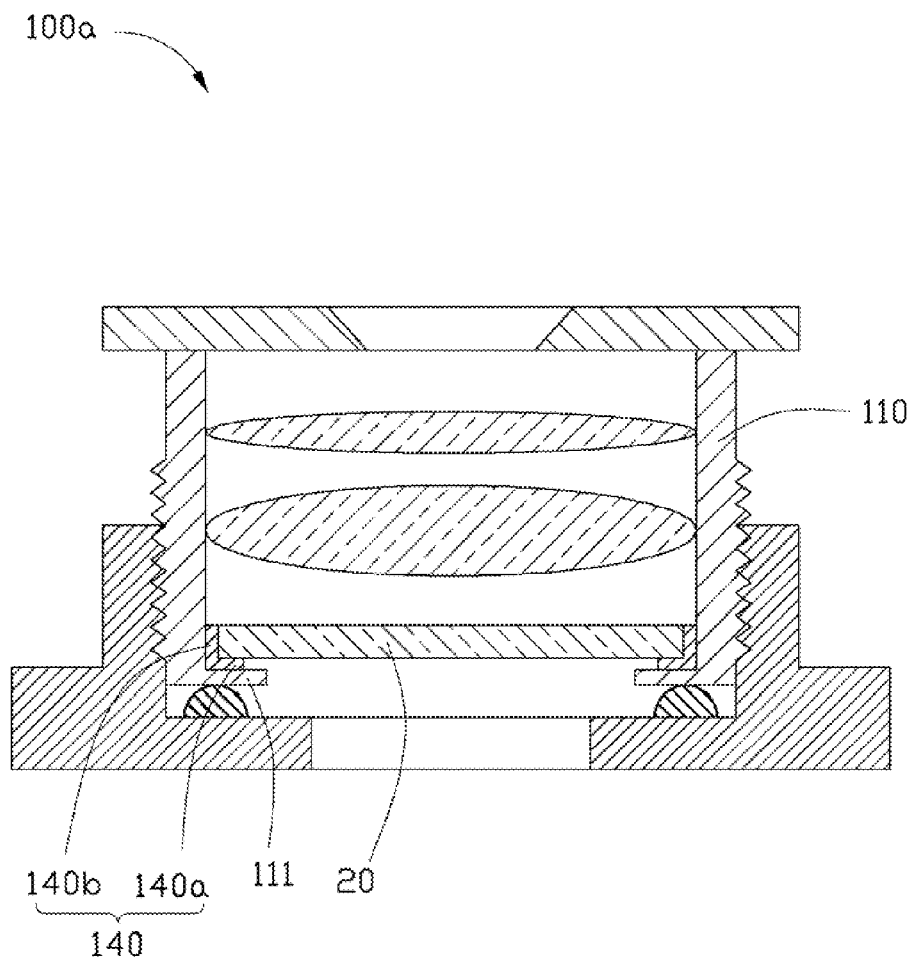
FIG. 3 is a cross-sectional view of a lens module, according to another embodiment.

Referring to FIG. 3, a lens module 100a according to a second embodiment is shown. In this embodiment, the polygonal filter 20 is not adhered to the annular plate 111 of the lens barrel 110 directly. The lens module 100a further includes a frame 140 disposed between the annular plate 111, the lens barrel 110, and the polygonal filter 20 for supporting the polygonal filter 20. The frame 140 includes an annular bottom portion 140a and a substantially annular upper portion 140b. The bottom portion 140a is interposed between the annular plate 111 and the polygonal filter 20. The inner diameter of the bottom portion 140a is smaller than the inscribed circle of the polygonal filter 20. The upper portion 140b has a circular outer periphery contacting the inner cylindrical surface of the lens barrel 110 and a polygonal inner periphery contacting the polygonal filter 20. The frame 140 can be made of soft and non-transparent flexible material, for avoiding friction being induced between the polygonal filter 20, the annular plate 111, and the lens barrel 110. In addition, the frame 140 can absorb stray light rays entering into gaps formed between the polygonal filter 20 and the lens barrel 110 due to shape mismatch.

When in assembly, the bottom of the polygonal filter 20 is adhered to the frame 140 first. Then, the frame 140 is adhered to the annular plate 111 and the lens barrel 110.

Figure 4:
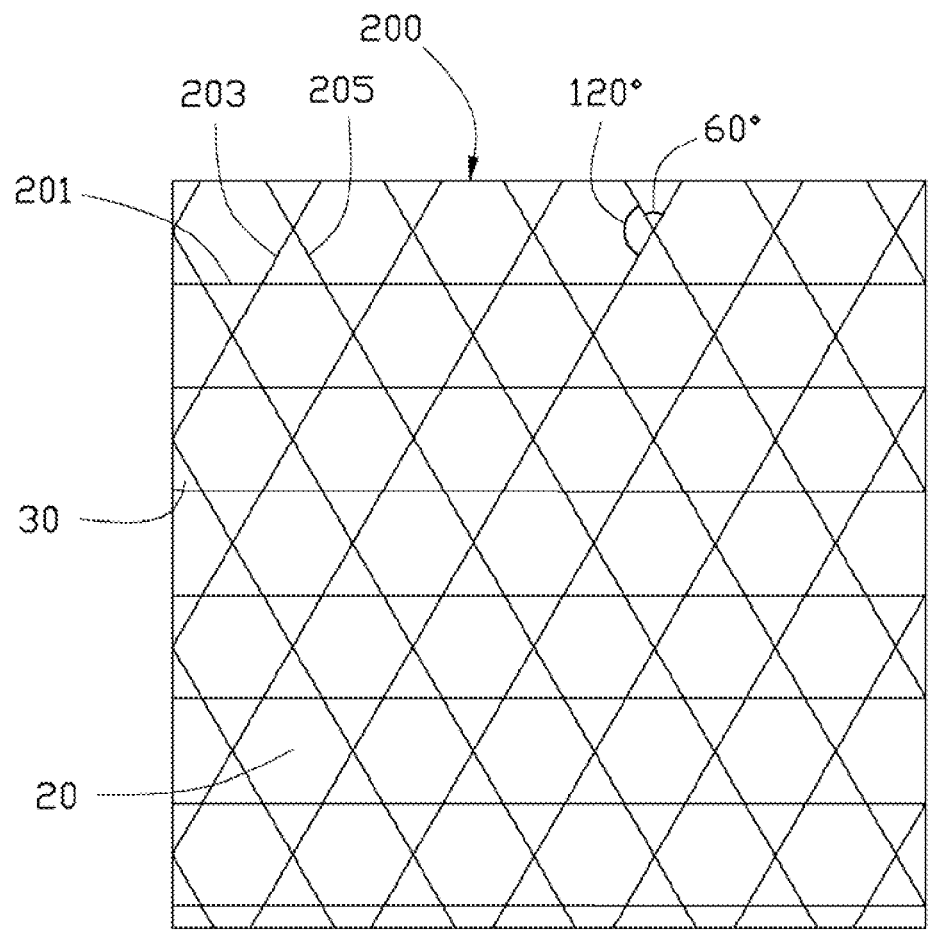
FIG. 4 is a schematic view showing an exemplary embodiment of a process for making regular hexagonal filters used in the lens module of FIG. 1.

Referring to FIG. 4, how to make a number of hexagon filters 20, which are optimally used in the lens module 100, on a block of filter block 200 is illustrated. A method for showing the making process includes the following steps S401-S405.

In step S401, a filter block 200, such as a glass block, is provided and a number of parallel and equidistant first lines 201 are scratched on the filter block 200 by a graver (not shown).

In step S403, a number of parallel, equidistant second lines 203 and third lines 205 are also scratched on the filter block 200. Included angles of each two intersected first, second, and third lines 201, 203 and 205 are equal to each other at 60 or 120 degrees. As such, a number of hexagons are shown on the filter block 200 by lines 201, 203, and 205.

In step S405, the filter block 200 is cut into a number of hexagonal filters 20 and a plurality of residual portions 30 by a diamond cutter, along the lines 201, 203, and 205. Thus, a number of regular hexagonal filters 20 are achieved.

Since the hexagonal filters 20 are achieved by simply cutting along the lines 201, 203, and 205, an efficiency of manufacturing the polygonal filters 20 increases, as compared to those needed to be subjected to a roll grinding process. On the other hand, due to the fact that a hexagonal filter has a larger filtering area compared to other polygonal filters with sides less than six in a same circumcircle diameter, the imaging quality of the lens module 100 by using hexagonal filter 20 can be improved.

While various exemplary and preferred embodiments have been described, it is to be understood that the disclosure is not limited thereto. To the contrary, various modifications and similar arrangements (as would be apparent to those skilled in the art), are also covered. Therefore, the scope of the appended claims should be accorded the broadest interpretation so as to encompass all such modifications and similar arrangements.

What is claimed is:

1. A lens module comprising:
   a lens barrel comprising an annular plate extending inwards from an inner surface thereof;
   a plurality of lenses received in the lens barrel;
   a holder holding the lens barrel; and
   a polygonal filter received in the lens barrel and positioned on the annular plate, the polygonal filter has six or more sides.

2. The lens module of claim 1, wherein the polygonal filter is a regular hexagonal filter.

3. The lens module of claim 2, wherein a method for cutting a filter block into multiple hexagonal filters comprising the following steps:
   scratching a plurality of parallel and equidistant first lines on a block of filter block;
   scratching a plurality of parallel, equidistant second lines and third lines on the filter block, and included angles of each two intersected first, second, and third lines are equal to each other at 60 or 120 degrees;
   cutting the filter block into a plurality of hexagonal filters and a plurality of residual portions, along the first, second and third lines.

4. The lens module of claim 1, wherein the diagonal of the polygonal filter is slightly shorter than the inner diameter of the barrel.

5. The lens module of claim 1, wherein the annular plate is integrally formed with the lens barrel.

6. The lens module of claim 5, wherein corners of the polygonal filter are adhered on a top surface of the annular plate and also adhered to the inner side surface of the barrel by transparent glue.

7. The lens module of claim 5, wherein a diameter of the inscribed circle of the polygonal filter is larger than the inner diameter of the annular plate.

8. The lens module of claim 1, further comprising a frame disposed between the annular plate, the polygonal filter, and the lens barrel, wherein the frame comprises a bottom portion and an upper portion, the bottom portion is interposed between the annular plate and the polygonal filter, the inner diameter of the bottom portion is smaller than the inscribed circle of the polygonal filter, the upper portion has an outer periphery contacting the inner surface of the lens barrel and a polygonal inner periphery contacting the polygonal filter.

9. The lens module of claim 8, wherein the frame is made of soft and non-transparent flexible material.

10. The lens module of claim 1, further comprising a cover fixed to an object-end of the lens barrel and defining an aperture generally at the center thereof to allow light rays to pass therethrough.

11. The lens module of claim 10, wherein the inner diameter of the annular plate is greatly larger than the diameter of the aperture.

* * * * *